US006370350B2

(12) United States Patent
Tomita

(10) Patent No.: US 6,370,350 B2
(45) Date of Patent: Apr. 9, 2002

(54) METHOD FOR DEVELOPING ELECTROSTATIC LATENT IMAGE AND DEVELOPING ROLLER AND DEVELOPING DEVICE THEREFOR

(75) Inventor: Kunihiko Tomita, Kanagawa-ken (JP)

(73) Assignee: Ricoh Company Limited, Tokyo (JP)

( * ) Notice: Subject to any disclaimer, the term of this patent is extended or adjusted under 35 U.S.C. 154(b) by 0 days.

(21) Appl. No.: 09/782,289

(22) Filed: Feb. 14, 2001

(30) Foreign Application Priority Data

Feb. 14, 2000 (JP) ....................................... 2000-034964

(51) Int. Cl.[7] ................................................ G03H 15/08

(52) U.S. Cl. ....................... 399/286; 399/265; 399/279; 492/25; 492/28

(58) Field of Search ................................ 399/265, 276, 399/279, 286; 428/35.8, 36.9, 402; 492/24, 25, 28, 48

(56) References Cited

U.S. PATENT DOCUMENTS 5,547,724 A * 8/1996 Kuribayashi ............... 428/35.8
5,862,444 A * 1/1999 Machida et al. ............ 399/286

FOREIGN PATENT DOCUMENTS

| | | | |
|---|---|---|---|
| JP | 52094140 | | 8/1977 |
| JP | 07-64388 | * | 3/1995 |

* cited by examiner

*Primary Examiner*—Arthur T. Grimley
*Assistant Examiner*—Hoang Ngo
(74) *Attorney, Agent, or Firm*—Oblon, Spivak, McClelland, Maier & Neustadt, P.C.

(57) ABSTRACT

A method for developing an electrostatic latent image including the step of developing an electrostatic latent image with a two component developer including a particulate carrier and a negatively charged toner and held on the surface of a developing roller to form a toner image, wherein the developing roller surface includes a material including one or more carbon atoms and one or more nitrogen atoms, and wherein a ratio of the number of carbon atoms to the number of nitrogen atoms is not greater than 100/1.

29 Claims, 1 Drawing Sheet

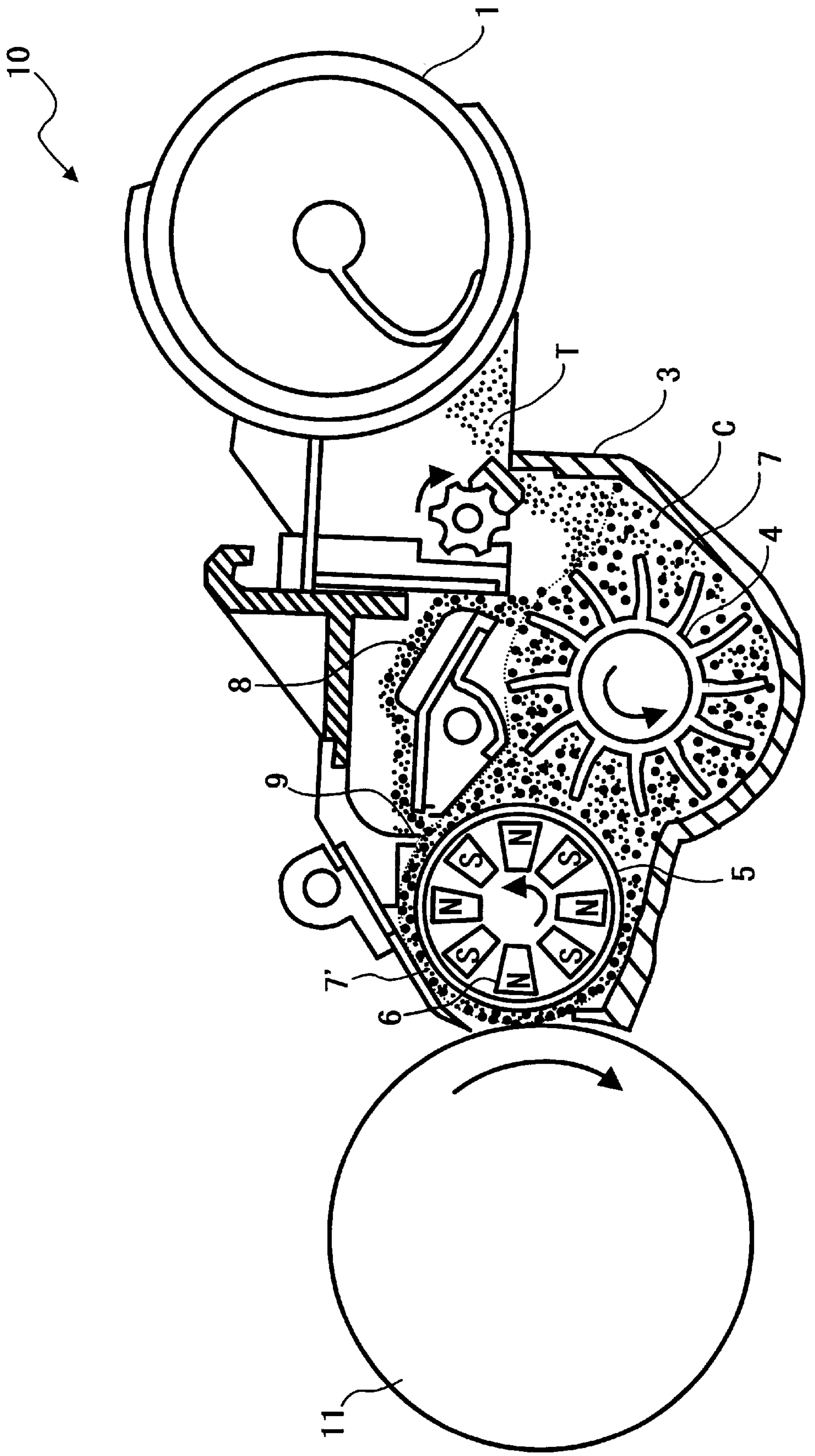
10
1
T
3
C
7
4
8
9
5
7'
6
11
N
S

METHOD FOR DEVELOPING ELECTROSTATIC LATENT IMAGE AND DEVELOPING ROLLER AND DEVELOPING DEVICE THEREFOR

BACKGROUND OF THE INVENTION

1. Field of the Invention

The present invention relates to a method for developing an electrostatic latent image, and more particularly to an image developing method in which an electrostatic latent image formed by electrophotography, electrostatic recording or the like method is developed using a two component developer including a carrier and a negatively charged toner to form a visual image. In addition, the present invention also relates to a developing roller and a developing device therefor.

2. Discussion of the Background

Various electrophotographic image forming methods have been disclosed in U.S. Pat. No. 2,297,691, Japanese Patent Publication No. 42-23910 (i.e., U.S. Pat. No. 3,666,363) etc.

In these image forming methods, visual images are typically formed as follows:

(1) an electrostatic latent image is formed on a photoreceptor, for example, by charging the photoreceptor and then irradiating the photoreceptor with imagewise light;

(2) the electrostatic latent image is developed with a toner to form a toner image on the photoreceptor;

(3) the toner image is transferred on a receiving material such as receiving paper; and (4) the toner image on the receiving paper is fixed thereon upon application of heat, pressure and/or a vaporized solvent thereto.

With respect to the method for developing an electrostatic latent image using a toner, various developing methods are known. For example, the following methods have been disclosed:

(1) developing methods using a magnetic brush (e.g., U.S. Pat. No. 2,874,063)

(2) cascade developing methods (e.g., U.S. Pat. No. 2,618,552);

(3) powder cloud developing methods (e.g., U.S. Pat. No. 2,221,776);

(4) developing methods using a fur brush; and (5) developing methods using a liquid toner.

Among these developing methods, magnetic brush developing methods and cascade developing methods, which use a two component developer including a toner and a particulate carrier, and liquid developing methods have been widely used.

In addition, Japanese Laid-Open Patent Publication No. 52-94140 (i.e., West German Patent No. 2,704,361) discloses a developing method utilizing dielectric polarization of a magnetic toner having a high electric resistance.

Further, developing methods utilizing frictional charging of a magnetic toner having a high resistance have been disclosed. In the developing methods, an electrostatic latent image is developed while being contacted with particles of the magnetic toner, which are typically charged by being rubbed with other toner particles, a developing sleeve and the like material, resulting in formation of a toner image.

As for the developing method using a two component developer, various methods are known. However, a typical developing method using a two component developer is as follows:

(1) a toner and a magnetic carrier are mixed and agitated with an agitator to charge the toner and carrier in a hopper of a developing unit; and (2) the mixture of the toner and carrier in the hopper is fed little by little to the developing portion of a photoreceptor by a magnetic roller such that fresh toner particles are supplied to the developing portion;

The hopper may include only a toner. In this case, the toner in the hopper is fed little by little to a magnetic roller on which a mixture (i.e., a developer) of the toner and a carrier is held. The toner and the carrier are mixed and agitated on the magnetic roller, and thereby the toner particles in the developer become to have a charge.

In these developing methods, the toner may be a magnetic toner or a non-magnetic toner. Namely, developing methods using a two component developer include developing methods using a magnetic two component developer and developing methods using a non-magnetic two component developer.

In addition, the toner may have a negative charge or positive charge. If a toner to be charged negatively is used, the toner particles in a thin developer layer formed on a developing roller have to be fully charged negatively. If the toner particles on the developing roller are not fully charged negatively, i.e., if toner particles having a positive charge are present in the developer, a background development problem occurs in which the background area of a toner image is undesirably developed with the positively charged toner particles.

In order to avoid such a background development problem, the following subjects should be investigated.

(1) What is the best material for the surface of the developing roller and/or carrier to effectively impart a frictional charge to toner particles?

(2) What is the best condition of the surface of the developing roller and/or carrier particles to effectively and uniformly impart a frictional charge to toner particles?

However, such subjects have not yet been investigated.

Therefore, the surface of a developing roller is designed after repeating trial and error. Accordingly, toner particles cannot be stably charged uniformly, and toner particles having an opposite charge are produced, resulting in occurrence of the background development problem. In addition, when the background development problem occurs, toner consumption increases, resulting in increase of running costs of image forming apparatus. Therefore, it inflicts a loss on users.

Because of these reasons, a need exists for a developing method by which images having good image qualities can be stably produced without causing the background development problem.

SUMMARY OF THE INVENTION

Accordingly, an object of the present invention is to provide a developing method by which images having good image qualities can be stably produced without causing the background development problem.

Specifically, an object of the present invention is to provide a developing roller which is configured to bear a two component developer while charging toner particles in the developer so that the toner particles have a uniform charge.

Another object of the present invention is to provide a developing roller and a developing device which develop an electrostatic latent image and which can produce good toner images without causing the background development problem.

Briefly these objects and other objects of the present invention as hereinafter will become more readily apparent can be attained by a method for developing an electrostatic latent image including the step of developing an electrostatic latent image with a two component developer including a particulate carrier and a negatively charged toner and held on the surface of a developing roller to form a toner image, wherein the developing roller surface includes a material including one or more carbon atoms and one or more nitrogen atoms, and wherein a ratio of the number of carbon atoms to the number of nitrogen atoms is not greater than 100/1.

The material in the surface of the developing roller may be a resin, or a combination of a binder resin and a low molecular weight compound including one or more carbon atoms and one or more nitrogen atoms, wherein the ratio of the carbon atoms to the nitrogen atoms is not greater than 100/1 by number.

In another aspect of the present invention, a two component developing method is provided which includes the step of developing an electrostatic latent image with a two component developer held on a developing roller to form a toner image, wherein the two component developer includes a particulate carrier and a negatively charged toner, wherein the particulate carrier has a surface layer including a material including one or more carbon atoms and one or more nitrogen atoms, and wherein the ratio of the number of carbon atoms to the number of nitrogen atoms is not greater than 100/1. In this method, the developing roller may be the developing roller of the present invention mentioned below.

In yet another aspect of the present invention, a developing roller is provided which develops an electrostatic latent image by a two component developer including a carrier and a negatively charged toner and held on the surface of the developing roller, wherein the surface of the developing roller includes a material including one or more carbon atoms and one or more nitrogen atoms, wherein the ratio of the number of carbon atoms to the number of nitrogen atoms is not greater than 100/1.

In a further aspect of the present invention, a developing device is provided which develops an electrostatic latent image and which includes a two component developer including a particulate carrier and a negatively charged toner; a developing roller which bears the two component developer on the surface thereof to develop the electrostatic latent image to form a toner image, wherein the surface of the developing roller includes a material including one or more carbon atoms and one or more nitrogen atoms, wherein the ratio of the number of carbon atoms to the number of nitrogen atoms is not greater than 100/1.

In this developing device, the surface of the carrier may have the surface layer mentioned above.

These and other objects, features and advantages of the present invention will become apparent upon consideration of the following description of the preferred embodiments of the present invention taken in conjunction with the accompanying drawing.

BRIEF DESCRIPTION OF THE DRAWING

Various other objects, features and attendant advantages of the present invention will be more fully appreciated as the same becomes better understood from the detailed description when considered in connection with the accompanying drawing in which like reference characters designate like corresponding parts throughout and wherein:

Figure is a schematic view illustrating a main part of an embodiment of the developing device of the present invention.

DETAILED DESCRIPTION OF THE INVENTION

Generally, the present invention provides a developing method including the steps of providing a developing roller whose surface includes a resin, wherein the resin includes one or more nitrogen atoms and one or more carbon atoms, and wherein the ratio of the number of one or more carbon atoms to the number of one or more nitrogen atoms is not greater than 100/1; forming a layer of a two component developer including a particulate carrier and a negatively charged toner on the surface of the developing roller; and developing an electrostatic latent image with the two component developer layer to form a toner image. By using such a developing method, the toner is stably charged negatively and therefore toner images having good image qualities can be stably produced without causing the background development problem.

The material (resin) in the surface part of the developing roller may be replaced with a combination of a binder resin and a low molecular weight compound having one or more carbon atoms and one or more nitrogen atoms, wherein the ratio of the number of carbon atoms to the number of nitrogen atoms is not greater than 100/1.

The content of the resin or the low molecular weight compound in the surface part of the roller is preferably not less than 50% by weight.

Alternatively, the developing method may include the steps of providing a developing roller; forming on the surface of the developing roller a two component developer layer including a carrier and a negatively charged toner, wherein the surface of the carrier is coated with a resin including one or more nitrogen atoms and one or more carbon atoms, and wherein the ratio of the number of one or more carbon atoms to the number of one or more nitrogen atoms is not greater than 100/1; and developing an electrostatic latent image with the two component developer layer to form a toner image. The resin may be replaced with a binder resin including a low molecular weight compound having one or more nitrogen atoms and one or more carbon atoms, and wherein the ratio of the one or more carbon atoms to the one or more nitrogen atoms is not greater than 100/1 by number.

The content of such a resin or such a low molecular weight compound in the surface layer of the carrier is preferably not less than 10% by weight.

The reason for the phenomenon that the toner is stably charged negatively is considered as follows.

In general, a nitrogen atom can have a 3-valence or 4-valence structure. Therefore a nitrogen atom tends to make a cation because of having insufficient outer shell electrons. When a nitrogen atom is combined with one or more other atoms to form a molecule, the molecule looks electrically natural. However, the nitrogen atom in the molecule has an electron releasing property. When an acidic substance is present near the molecule, the outer shell electrons approach the acidic substance, and thereby the molecule serves as a pseudo-base.

In general, a negatively charged toner typically includes a negative charge controlling agent. The negative charge controlling agent is an acidic substance, namely the agent tends to receive electrons. Therefore, the toner tends to be charged negatively.

When a layer of a two component developer including a toner to be charged negatively is formed on a developing roller on the surface of which is coated with a resin including one or more carbon atoms and one or more nitrogen atoms, wherein the ratio of the carbon atoms to the nitrogen atoms is not greater than 100/1 by number, the developing roller and the carrier, which are rubbed with the toner, become a pseudo-base and are securely charged positively because the toner is acidic. In addition the toner is securely charged negatively.

When the surfaces of developing roller and the carrier include such a positively chargeable resin, the toner can be uniformly charged negatively.

Suitable resins for use as such a resin in the present invention include polyamides, polyimides, polyamines, polyacrylamides, polyacrylimides, polyethylene amindes, polyethylene imines, polyaryl amines, aminopolyacryl amides, polyamideimides, polyetherimides, polyoxyethylene alkyl amines, polyglycidyl amine type epoxy resins, urea resins, aminoacid resins, plyacrylonitrile, polyurethane resins, melamine resins, and copolymers of two or more of these resins and copolymers of one or more of these resins with one or more others resins. These resins are used alone or in combination.

In addition, these resins can be used together with one or more other resins.

The developer roller of the present invention can be prepared by coating such a resin on the surface of a roller, or forming a roller using such a resin.

Specific examples of such a low molecular weight compounds having one or more nitrogen atoms and one or more carbon atoms include for use in the developing roller or carrier of the present invention include:

Derivatives of Imidazole and Triazine imidazole, 2-methylimidazole, 2-ethyl-4-ethylimidazole, 2-phenylimidazole, 2-undecylimidazole, 2-heptadecylimidazole, 1-benzyl-2-methylimidazole, 2-phenyl-4-methylimidazole, 1-cyanoethylimidazole, 1-cyanoethyl-2-methylimidazole, 1-cyanoethyl-2-phenylimidazole, 1-cyanoethyl-2-ethyl-4-methylimidazole, 1-aminoethyl-2-methylimidazole, 1-(cyanoethylaminoethyl)-2-methylimidazole, N-[2-(2-methyl-1-imidazolyl)]urea, 1-cyanoethyl-2-undecylimidazole, 1-cyanoethyl-2-methylimidazole trimellitate, 1-cyanonethyl-2-ethyl-4-methylimidazole trimellitate, 1-cyanonethyl-2-undecylimidazole trimellitate, 2,4-diamino-6-[2-methyl-1-imidazolyl]-ethyl-1,3,5-triazine, 2,4-diamino-6-(2-undecyl-1-imidazolylethyl)-1,3,5-triazine, 2,4-diamino-6-[2-ethyl-4-methyl-1-imidazolylethyl]-1,3,5-triazine, 1-dodecyl-2-methyl-3-benzylimidazoliumchloride, N,N'-bis(2-methyl-1-imidazolylethyl)urea, N,N'-2-methyl-1-imidazolylethyl) adipoamide, 2,4-dialkylimidazole-5-dithiocarboxylic acid, 1,3-dibenzyl-2-methylimidazolium chloride, 2-phenyl-4-methyl-5-hydroxymethylimidazole, 2-phenyl-4,5-bis (hydroxymethyl)imidazole, 1-cyanoethyl-2-phenyl-4,5-bis (cyanoethoxymethyl)imidazole, 1-cyanoethyl-2-phenyl-4,5-bis (cyanoethoxymethyl)imidazole, an adduct of 2-methylimidazole with isocyanuric acid, an adduct of phenylimidaole with isocyanuric acid, an adduct of 2,4-diamino-6-[2-methyl-1-imidazolylethyl]-1,3,5-triazine with isocyanuric acid, 2-alkyl-4-formylimidazole, 2,4-dialkyl-5-formylimidazole, 2,4,6-carboxylphenyl-1,3,5-triazine, 2,4-diamino-6-phenyl-1,3,5-triazine, and 2,4-6-triamino-1,3,5-triazine.

Quaternary Ammonium Salts Having a Formula R4NX, Wherein R Represents an Alkyl Group, an Aryl Group or the Like; and X Represents Cl, Br, I, SO or the Like)

1-methylacetic acid ester-5-mercapto-1,2,3,4-tetrazole, 3-methyl-5-pyrazolone, and 1-methylol-5,5-diethylhindantoin.

Others

Polyamides, polyimides, polyamines, polyimines, polycrylamides, polyacrylimides, polyethyleneimine, polyarylamines, polyamideimides, polyetherimides, polyoxyethylenealkylamines, polyglycidylamine type epoxy resins, urea resins, amino acid resins, polyacrylonitrile, polyurethane resins, melamine resins, and copolymers and mixtures of these resins. These resins have a relatively low molecular weight compared to the resins mentioned above.

The developing roller of the present invention can be prepared by coating a mixture of a binder resin and such a low molecular weight compound, or forming a roller using such a mixture.

Then the particulate carrier for use in the developing method and device of the present invention will be explained.

The core material of the particulate carrier of the present invention is not particularly limited, and known core materials can be used as the core material. Specific examples of such core materials include metals such as ferrite, magnetite, iron, nickel and cobalt; metal alloys or mixtures of the metals mentioned above with zinc, antimony, aluminum, lead, tin, bismuth, beryllium, manganese, selenium, tungsten, zirconium, and vanadium; mixtures of the metals mentioned above with metal oxides such as iron oxides, titanium oxides and magnesium oxides; mixtures of the metals mentioned above with metal carbides such as silicon carbides, and tungsten carbides; and ferromagnetic ferrites. These materials can be used alone or in combination.

In the present invention, the surface of the carrier in the two component developer may be coated with a material including one or more carbon atoms and one or more nitrogen atoms, wherein the ratio of the carbon atoms to nitrogen atoms is not greater than 100/1 by number. In this case, the surface of the developing roller, on which a layer of the two component developer is formed, may or may not include a material including one or more carbon atoms and one or more nitrogen atoms, wherein the ratio of the carbon atoms to nitrogen atoms is not greater than 100/1 by number.

Suitable materials for use as such a material in the surface layer of the carrier include the resins and low molecular weight compounds mentioned above for use in the surface part of the developing roller of the present invention.

The content of the material in the surface layer of the carrier is preferably not less than 10% by weight on a dry basis.

The toner for use in the developing method of the present invention is not particularly limited except that the toner is negatively chargeable, and known negatively chargeable toners can be used in the present invention.

Figure is a schematic view illustrating a main part of an embodiment of the developing device of the present invention.

In Figure, numeral 10 denotes a developing device. The developing device 10 includes a toner container 1, a toner hopper 2, and a toner mixing room 3. In the toner mixing room 3, a toner T supplied from the toner hopper 2 is mixed with a developer 7, which includes a particulate carrier C and the previously added toner, by an agitator 4. The developer 7 is fed toward a developing roller 5 by the agitator 4 which rotates in a direction as indicated by an arrow. Then the developer 7 is fed toward an image bearing member 11, on which an electrostatic latent image is formed, by means of a magnet 6 which rotates in a direction as indicated by an arrow. The developer 7 is regulated by a regulator 9, resulting in formation of a developer layer 7' on the developing roller 5. Numeral 8 denotes a separator which returns the developer raked by the regulator 9.

The electrostatic latent image on the image bearing member 11 is developed by the developer layer 7' on the developing roller 5, resulting in formation of toner image on the image bearing member 11.

At this point, the toner T is negatively charged. In addition, the developing roller 5 is the developing roller of the present invention. Namely the surface of the developing roller is coated with a material including one or more carbon atoms and one or more nitrogen atoms, wherein a ratio of carbon atoms to nitrogen atoms is not greater than 100/1. Alternatively, the surface of the carrier may have a surface layer including the material mentioned above.

The polarity of the electrostatic latent image on the image bearing member 11 may be positive or negative. If the polarity is positive, the electrostatic latent image attracts the negatively charged toner, and therefore a positive toner image is formed. Namely, the electrostatic latent image is visualized as it is. On the contrary the polarity of the electrostatic latent image is negative, the latent image repulses the negatively charged toner, and therefore a negative toner image is formed.

To form an electrostatic latent image on the image bearing member, for example, the following methods can be used:

(1) A photoreceptor serving as an image bearing member is charged and then exposed to imagewise light to form an electrostatic latent image thereon;

(2) An electrostatic latent image formed on a photoreceptor is transferred onto an intermediate transfer belt to form an electrostatic latent image on the intermediate transfer belt serving as an image bearing member; and (3) A dielectric recording paper or film serving as an image bearing member is imagewise charged with a recording head having multi-styli or a recording head having an ion gun array to form an electrostatic latent image on the dielectric recording paper or film.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

An electrostatic latent image formed on an electrophotographic organic photoreceptor was developed using a developing device as shown in Figure. The following developing roller and two component developer were used.

Developing Roller:

surface of the developing roller was coated with an amino acid resin, wherein the ratio of the carbon atoms to the nitrogen atoms in the amino acid resin is about 60:1 by number Two Component Developer Carrier: a particulate magnetic carrier whose surface was coated with a silicone resin modified a carboxyl group and having no nitrogen atom Toner:

a toner to be charged negatively

Thus a toner image was formed on the photoreceptor.

An adhesive tape was attached to a background area of the toner image on the photoreceptor and then peeled therefrom such that the toner particles on the background area were adhered to the tape. The tape having toner particles was then attached on a white paper to measure the reflection density ($GD_1$) of the tape, which had toner particles and was adhered on the white paper, with a reflection densitometer. In addition, another piece of the same adhesive tape, on which toner particles were not adhered, was also attached on the white paper to measure the reflection density ($GD_0$) of the tape on the white paper to determine $\Delta GD$ (i.e., $GD_1$-$GD_0$). At this point, the more the value of $\Delta GD$, the worse the background development.

As a result, $\Delta GD$ was 0.04.

Example 2

The procedures for preparation of the toner image and measurements of reflection density in Example 1 were repeated except that the developing roller was replaced with the following developing roller:

Developing Roller:

surface of the developing roller was coated with a urea resin, wherein the ratio of the carbon atoms to the nitrogen atoms in the urea resin is about 20:1 by number As a result, $\Delta GD$ was 0.04.

Example 3

The procedures for preparation of the toner image and measurements of reflection density in Example 1 were repeated except that the developing roller was replaced with the following developing roller:

Developing roller:

surface of the roller was coated with a melamine resin, wherein the ratio of the carbon atoms to the nitrogen atoms in the melamine resin is about 30:1 by number As a result, $\Delta GD$ was 0.04.

Example 4

The procedures for preparation of the toner image and measurements of reflection density in Example 1 were repeated except that the developing roller was replaced with the following developing roller:

Developing roller:

surface of the roller was coated with a urethane resin, wherein the ratio of the carbon atoms to the nitrogen atoms in the urethane resin is about 90:1 by number As a result, $\Delta GD$ was 0.04.

Example 5

The procedures for preparation of the toner image and measurements of reflection density in Example 1 were repeated except that the developing roller was replaced with the following developing roller:

Developing Roller:

surface of the roller was coated with a polyamide resin, wherein the ratio of the carbon atoms to the nitrogen atoms in the polyamide resin is about 70:1 by number As a result, $\Delta GD$ was 0.02.

Example 6

The procedures for preparation of the toner image and measurements of reflection density in Example 1 were repeated except that the developing roller was replaced with the following developing roller:

Developing roller:

surface of the roller was coated with a urethane-silicone copolymer, wherein the ratio of the carbon atoms to the nitrogen atoms in the urethane-silicone copolymer is about 50:1 by number As a result, ΔGD was 0.04.

Example 7

The procedures for preparation of the toner image and measurements of reflection density in Example 1 were repeated except that the developing roller was replaced with the following developing roller:

Developing Roller:

surface of the roller was coated with a polyester resin including 2,4-diamino-6-phenyl-1,3,5-triazine in an amount of 50% by weight)

As a result, ΔGD was 0.04.

Example 8

The procedures for preparation of the toner image and measurements of reflection density in Example 1 were repeated except that the developing roller was replaced with the following developing roller:

Developing Roller:

surface of the roller was coated with an acrylic resin including triethylbenzylammonium chloride in an amount of 60% by weight)

As a result, ΔGD was 0.04.

Example 9

The procedures for preparation of the toner image and measurements of reflection density in Example 1 were repeated except that the developing roller and the carrier were replaced with the following developing roller and carrier:

Developing Roller:

surface of the roller was coated with an amino acid resin, wherein the ratio of the carbon atoms to the nitrogen atoms in the amino acid resin is about 60:1 by number Two Component Developer Carrier: a particulate magnetic carrier whose surface was coated with a silicone resin modified an amino group As a result, ΔGD was 0.02.

Example 10

The procedures for preparation of the toner image and measurements of reflection density in Example 9 were repeated except that the developing roller was replaced with the following developing roller:

Developing Roller:

surface of the roller was coated with a urea resin, wherein the ratio of the carbon atoms to the nitrogen atoms in the urea resin is about 20:1 by number As a result, ΔGD was 0.02.

Example 11

The procedures for preparation of the toner image and measurements of reflection density in Example 9 were repeated except that the developing roller was replaced with the following developing roller:

Developing Roller:

surface of the roller was coated with a melamine resin, wherein the ratio of the carbon atoms to the nitrogen atoms in the melamine resin is about 30:1 by number As a result, ΔGD was 0.02.

Example 12

The procedures for preparation of the toner image and measurements of reflection density in Example 9 were repeated except that the developing roller was replaced with the following developing roller:

Developing Roller:

surface of the roller was coated with a urethane resin, wherein the ratio of the carbon atoms to the nitrogen atoms in the urethane resin is about 90:1 by number As a result, ΔGD was 0.02.

Example 13

The procedures for preparation of the toner image and measurements of reflection density in Example 9 were repeated except that the developing roller was replaced with the following developing roller:

Developing Roller:

surface of the roller was coated with a polyamide resin, wherein the ratio of the carbon atoms to the nitrogen atoms in the polyamide resin is about 70:1 by number As a result, ΔGD was 0.01.

Example 14

The procedures for preparation of the toner image and measurements of reflection density in Example 9 were repeated except that the developing roller was replaced with the following developing roller:

Developing Roller:

surface of the roller was coated with a urethane-silicone copolymer, wherein the ratio of the carbon atoms to the nitrogen atoms in the urethane-silicone copolymer is about 50:1 by number As a result, ΔGD was 0.02.

Example 15

The procedures for preparation of the toner image and measurements of reflection density in Example 9 were repeated except that the developing roller was replaced with the following developing roller:

Developing Roller:

surface of the roller was coated with a polyester resin including 2,4-diamino-6-phenyl-1,3,5-triazine in an amount of 50% by weight As a result, ΔGD was 0.02.

Example 16

The procedures for preparation of the toner image and measurements of reflection density in Example 9 were repeated except that the developing roller was replaced with the following developing roller:

Developing Roller:

surface of the roller was coated with an acrylic resin including triethylbenzylammonium chloride in an amount of 60% by weight As a result, ΔGD was 0.02.

Example 17

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with an amino acid resin having a formula in which the ratio of the carbon atoms to the nitrogen atoms is about 60:1 by number As a result, ΔGD was 0.04.

Example 18

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urea resin having a formula in which the ratio of the carbon atoms to the nitrogen atoms is about 20:1 by number As a result, ΔGD was 0.04.

Example 19

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a melamine resin having a formula in which the ratio of the carbon atoms to the nitrogen atoms is about 30:1 by number As a result, ΔGD was 0.04.

Example 20

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urethane resin having a formula in which the ratio of the carbon atoms to the nitrogen atoms is about 90:1 by number As a result, ΔGD was 0.04.

Example 21

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a polyamide resin having a formula in which the ratio of the carbon atoms to the nitrogen atoms is about 70:1 by number As a result, ΔGD was 0.01.

Example 22

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urethane-silicone copolymer having a formula in which the ratio of the carbon atoms to the nitrogen atoms is about 50:1 by number As a result, ΔGD was 0.04.

Example 23

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a polyester resin including 2,4-diamino-6-phenyl-1,3,5-triazine in an amount of 50% by weight As a result, ΔGD was 0.04.

Example 24

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with an acrylic resin including triethylbenzyl ammonium chloride in an amount of 60% by weight As a result, ΔGD was 0.04.

Example 25

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with an amino acid resin having a formula in which the ratio of the carbon atoms to the nitrogen atoms is about 60:1 by number As a result, ΔGD was 0.02.

Example 26

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urea resin having a formula in which the ratio of the carbon atoms to the nitrogen atoms is about 20:1 by number As a result, ΔGD was 0.02.

Example 27

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a melamine resin having a formula in which the ratio of the carbon atoms to the nitrogen atoms is about 30:1 by number As a result, ΔGD was 0.02.

Example 28

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urethane resin having a formula in which the ratio of the carbon atoms to the nitrogen atoms is about 90:1 by number As a result, ΔGD was 0.02.

Example 29

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a polyamide resin having a formula in which the ratio of the carbon atoms to the nitrogen atoms is about 70:1 by number As a result, ΔGD was 0.02.

Example 30

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a urethane-silicone copolymer having a formula in which the ratio of the carbon atoms to the nitrogen atoms is about 50:1 by number As a result, ΔGD was 0.02.

Example 31

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with a polyester resin including 2,4-diamino-6-phenyl-1,3,5-triazine in an amount of 50% by weight As a result, ΔGD was 0.02.

Example 32

The procedures for preparation of the toner image and measurements of reflection density in Example 1 were repeated except that the developing roller and the carrier in the two component developer were replaced with the following developing roller and carrier:

Developing Roller:

surface of the roller was made of aluminum

Two Component Developer

Carrier: a particulate magnetic carrier whose surface was coated with an acrylic resin including triethylbenzyl ammonium chloride in an amount of 60% by weight As a result, ΔGD was 0.02.

Example 33

The procedures for preparation of the toner image and measurements of reflection density in Example 1 were repeated except that the developing roller and the carrier in the two component developer were replaced with the following developing roller and carrier:

Developing Roller:

surface of the roller was coated with a polyamide resin having a formula in which the ratio of carbon atoms to nitrogen atoms is about 70:1 by number Two Component Developer Carrier: a particulate magnetic carrier whose surface was coated with an amino acid resin having a formula in which the ratio of the carbon atoms to the nitrogen atoms is about 60:1 by number As a result, ΔGD was 0.01.

Example 34

The procedures for preparation of the toner image and measurements of reflection density in Example 1 were repeated except that the developing roller and the carrier in the two component developer were replaced with the following developing roller and carrier:

Developing Roller:

surface of the roller was coated with a guanamine resin having a formula in which the ratio of the carbon atoms to the nitrogen atoms is about 40:1 by number Two Component Developer Carrier: a particulate magnetic carrier whose surface was coated with a polyamide resin having a formula in which the ratio of the carbon atoms to the nitrogen atoms is about 70:1 by number As a result, ΔGD was 0.01.

Comparative Example 1

The procedures for preparation of the toner image and measurements of reflection density in Example 1 were repeated except that the developing roller was replaced with the following developing roller:

Developing Roller:

surface of the roller was coated with a polyester resin having no nitrogen atom

As a result, ΔGD was 1.20.

Comparative Example 2

The procedures for preparation of the toner image and measurements of reflection density in Example 1 were repeated except that the developing roller was replaced with the following developing roller and carrier:

Developing Roller:

surface of the roller was coated with a polyamide resin having a formula in which the ratio of the carbon atoms to the nitrogen atoms is about 140:1 by number As a result, ΔGD was 0.09.

Comparative Example 3

The procedures for preparation of the toner image and measurements of reflection density in Example 1 were repeated except that the developing roller was replaced with the following developing roller and carrier:

Developing Roller:

a roller whose surface was coated with a polyester resin including 2,4-diamino-6-phenyl-1,3,5-triazine in an amount of 10% by weight As a result, ΔGD was 0.08.

Comparative Example 4

The procedures for preparation of the toner image and measurements of reflection density in Example 1 were repeated except that the developing roller was replaced with the following developing roller and carrier:

Developing Roller:

surface of the roller was coated with a polyamide resin having a formula in which the ratio of the carbon atoms to the nitrogen atoms is about 200:1 by number As a result, ΔGD was 0.06.

As can be understood from the above-mentioned description, good toner images having very low background density can be produced by the developing method, developing roller and/or developing device of the present invention.

This document claims priority and contains subject matter related to Japanese Patent Application No. 2000-034964 filed on Feb. 14, 2000, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured new by Letters Patent of the United States is:

1. A method for developing an electrostatic latent image comprising:

developing an electrostatic latent image with a two component developer on a surface of a developing roller to form a toner image, wherein the two component developer comprises a particulate carrier and a negatively charged toner, and wherein said developing roller surface comprises a material comprising one or more carbon atoms and one or more nitrogen atoms, wherein a ratio of the number of one or more carbon atoms to the number of one or more nitrogen atoms is not greater than 100/1.

2. The method according to claim 1, wherein the first material is a resin, and wherein the resin is present in the surface in an amount of not less than 50% by weight.

3. The method according to claim 1, wherein the surface further comprises a binder resin and the material is a low molecular weight compound, and wherein the binder resin includes the low molecular weight compound therein.

4. The method according to claim 3, wherein the low molecular weight compound is present in the surface in an amount of not less than 50% by weight.

5. A method for developing an electrostatic latent image comprising:

developing an electrostatic latent image with a two component developer held on a developing roller to form a toner image, wherein said two component developer comprises a particulate carrier and a negatively charged toner on a surface of the developing roller, wherein the particulate carrier has a surface layer comprising a material comprising one or more carbon atoms and one or more nitrogen atoms, and wherein a ratio of the number of one or more carbon atoms to the number of one or more nitrogen atoms is not greater than 100/1.

6. The method according to claim 5, wherein the material is a resin, and wherein the resin is present in the surface layer in an amount of not less than 10% by weight.

7. The method according to claim 5, wherein the surface layer further comprises a binder resin and the material is a low molecular weight compound, and wherein the binder resin includes the low molecular weight compound therein.

8. The method according to claim 7, wherein the low molecular weight compound is present in the surface layer in an amount of not less than 10% by weight.

9. The method according to claim 1, wherein the particulate carrier has a surface layer comprising a material comprising one or more carbon atoms and one or more nitrogen atoms, and wherein a ratio of the number of one or more carbon atoms to the number of one or more nitrogen atoms in the second material is not greater than 100/1.

10. The method according to claim 9, wherein the material is a resin, and wherein the resin is present in the surface layer in an amount of not less than 10% by weight.

11. The method according to claim 9, wherein the surface layer further comprises a binder resin and the material is a low molecular weight compound, and wherein the binder resin includes the low molecular weight compound therein.

12. The method according to claim 11, wherein the low molecular weight compound is present in the surface layer in an amount of not less than 10% by weight.

13. A developing roller, wherein a surface of the developing roller comprises a material comprising one or more carbon atoms and one or more nitrogen atoms, and wherein a ratio of the number of one or more carbon atoms to the number of one or more nitrogen atoms is not greater than 100/1.

14. The developing roller according to claim 13, wherein the material is a resin, and wherein the resin is present in the surface in an amount of not less than 50% by weight.

15. The developing roller according to claim 13, wherein the surface further comprises a binder resin and the material is a low molecular weight compound, and wherein the binder resin includes the low molecular weight compound therein.

16. The developing roller according to claim 15, wherein the low molecular weight compound is included in the surface in an amount of not less than 50% by weight.

17. A developing device comprising:

a two component developer comprising a particulate carrier and a negatively charged toner; and a developing roller which bears the two component developer on a surface thereof to develop the electrostatic latent image to form a toner image, wherein the surface of the developing roller comprises a material comprising one or more carbon atoms and one or more nitrogen atoms, and wherein a ratio of the number of one or more carbon atoms to the number of one or more nitrogen atoms is not greater than 100/1.

18. The developing device according to claim 17, wherein the material is a first resin, and wherein the resin is present in the surface in an amount of not less than 50% by weight.

19. The developing device according to claim 17, wherein the surface further comprises a binder resin and the material is a low molecular weight compound, and wherein the binder resin includes the low molecular weight compound therein.

20. The developing device according to claim 19, wherein the low molecular weight compound is included in the surface in an amount of not less than 50% by weight.

21. A developing device comprising:

a two component developer comprising a particulate carrier and a negatively charged toner; and a developing roller which bears the two component developer on a surface thereof to develop the electrostatic latent image to form a toner image, wherein the particulate carrier has a surface layer comprising a material comprising one or more carbon atoms and one or more nitrogen atoms, and wherein a ratio of the number of one or more carbon atoms to the number of one or more nitrogen atoms is not greater than 100/1.

22. The developing device according to claim 21, wherein the material is a resin, and wherein the resin is present in the surface layer in an amount of not less than 10% by weight.

23. The developing device according to claim 21, wherein the surface layer further comprises a binder resin and the second material is a low molecular weight compound, and wherein the binder resin includes the low molecular weight compound therein.

24. The developing device according to claim 23, wherein the low molecular weight compound is present in the surface layer in an amount of not less than 10% by weight.

25. The developing device according to claim 17, wherein the particulate carrier has a surface layer comprising a material comprising one or more carbon atoms and one or more nitrogen atoms, and wherein a ratio of the number of one or more carbon atoms to the number of one or more nitrogen atoms in the material is not greater than 100/1.

26. The developing device according to claim 17, wherein the material in the surface layer is a resin, and wherein the resin is present in the surface layer in an amount of not less than 10% by weight.

27. The developing device according to claim 17, wherein the surface layer further comprises a binder resin and the material in the surface layer is a low molecular weight compound, and wherein the binder resin includes the low molecular weight compound therein.

28. The developing device according to claim 27, wherein the low molecular weight compound is present in the surface layer in an amount of not less than 10% by weight.

29. A toner image produced according to the method of claim 1.

* * * * *